United States Patent [19]
Allcock et al.

[11] Patent Number: 5,914,388
[45] Date of Patent: Jun. 22, 1999

[54] SYNTHESIS POLYPHOSPHAZENES WITH CONTROLLED MOLECULAR WEIGHT AND POLYDISPERITY

[75] Inventors: Harry R. Allcock, State College, Pa.; Christopher T. Morrissey, Fairfield, Ohio; Ian Manners, Oakville, Canada; Charles H. Honeyman, Boston, Mass.; James M. Nelson, Minneapolis, Minn.; Chester A. Crane; Scott D. Reeves, both of State College, Pa.; A. Paul Primrose, University Park, Pa.; Thomas J. Hartle; R. Prange, both of State College, Pa.

[73] Assignee: The Penn State Research Foundation, University Park, Pa.

[21] Appl. No.: 08/917,069

[22] Filed: Aug. 22, 1997

Related U.S. Application Data

[63] Continuation-in-part of application No. 08/429,521, Apr. 26, 1995, Pat. No. 5,698,664
[60] Provisional application No. 60/024,318, Aug. 22, 1996, abandoned, and provisional application No. 60/029,980, Nov. 7, 1996, abandoned.

[51] Int. Cl.[6] .................................................. C08G 79/02
[52] U.S. Cl. ........................... 528/399; 528/26; 528/167; 528/168; 528/169; 528/223; 528/224; 528/225; 528/228; 528/287; 528/363; 528/399; 525/538
[58] Field of Search ...................................... 528/167, 168, 528/169, 26, 223, 224, 225, 228, 287, 363, 399; 525/538

[56] References Cited

U.S. PATENT DOCUMENTS

| | | | |
|---|---|---|---|
| 5,567,783 | 10/1996 | Allcock et al. | 528/399 |
| 5,688,888 | 11/1997 | Burkus, II et al. | 528/399 |
| 5,698,664 | 12/1997 | Allcock et al. | 528/399 |
| 5,747,604 | 5/1998 | Allcock et al. | 528/399 |

*Primary Examiner*—P. Hampton-Hightower
*Attorney, Agent, or Firm*—Thomas J. Monahan

[57] ABSTRACT

A process for the preparation of polyphosphazenes is provided that includes the cationic solution polymerization reaction of a phosphoranimine, using a main group or transition metal halide, or other appropriate halide salt, including a linear phosphazene salt of any chain length, or a preformed non-phosphazene polymer containing a main or transition metal chloride, as an initiator. In a preferred embodiment, triarmed-star polyphosphazenes having the formula $N\{RN(H)R'_2P-(N=PR'_2)_n\}_3$ are prepared via this method. Also, a methods for synthesis of the monomer $Cl_3P=NSiMe_3$ and cyclic trimer $N_3P_3X_6$ from the reactants $N(SiR_3)_3$ and $PX_5$ are also described.

6 Claims, No Drawings

SYNTHESIS POLYPHOSPHAZENES WITH CONTROLLED MOLECULAR WEIGHT AND POLYDISPERITY

This application is a continuation-in-part application of U.S. Ser. No. 08/429,521 filed on Apr. 26, 1995 now U.S. Pat. No. 5,698,664 issued Dec. 16, 1997. Additionally, this application claims priority to U.S. Provisional application Ser. Nos. 60/024,318 filed Aug. 22, 1996 and 60/029,980 filed Nov. 7, 1996 both now abandoned.

FIELD OF THE INVENTION

This invention is in the area of polymer synthesis, and in particular, is a convenient and mild process for the preparation of polyphosphazenes having controlled molecular weight and polydispersity. The invention also includes a convenient route for the preparation of monomer, cyclic trimer, triarmed star-polyphosphazene, and block copolymers of polyphosphazenes.

The U.S. Government has rights in this invention arising out of the partial funding of work leading to this invention through one or more grants from the U.S. Office of Naval Research.

BACKGROUND OF THE INVENTION

Polyphosphazenes are a broad and well known class of macromolecules based on the repeating unit $-(NPR_2)-_n$, wherein R can be selected from a wide range of organic or inorganic substituent groups. It has been estimated that by mid 1997 roughly 700 types of polyphosphazenes had been synthesized and characterized, approximately 2000 publications and patents had appeared, and disclosures were appearing at a rate of 170–200 per year on this class of polymers. Polyphosphazenes, *J. of Inorganic and Organometallic Polymers*, 1992, 2 (2), 197–211.

The predominant route to polyphosphazenes to date has been through the thermal polymerization of hexachlorocyclotriphosphazene (cyclic trimer), also referred to as phosphonitrilic chloride, to poly(dichlorophosphazene) (which has an IUPAC name of poly(nitrilodichlorophosphoranetriyl). This route is illustrated in Scheme 1 below.

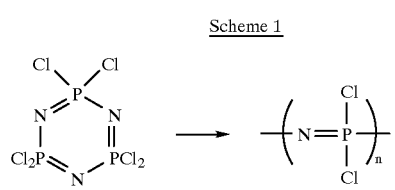

SCHEME 1

Polymerization of Hexachlorocyclotriphosphazene

Although poly(dichlorophosphazene) is a hydrolytically unstable elastomer, it can be converted to a wide range of derivatives by macromolecular nucleophilic substitution reactions with a broad variety of nucleophiles. As illustrated in Scheme 2 below, poly(organophosphazenes) are generally prepared by reacting one or more organic or organometallic nucleophiles (R in Scheme 2) with poly(dichlorophosphazene). See, for example, Allcock et al., *Macromol* 1986, 19, 1508, and Blonsky et al., *J. Am. Chem. Soc.* 1984, 106, 6854.

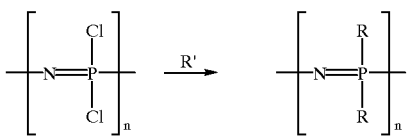

SCHEME 2

Synthesis of Poly(organophosphazenes

The substituent groups on the polymer backbone largely determine the properties of the resulting polymers. By appropriate selection of the substituent groups, one can obtain a phosphazene polymer with, for example, a target glass transition temperature; target physical characteristics such as film forming properties; organogel or hydrogel behavior; desired hydrophobicity or hydrophilicity; amorphous or microcrystalline character; and advanced liquid crystalline, photochromic, or nonlinear optical properties. Mark; J. E.; Allcock, H. R.; West, R. *Inorganic Polymers* Prentice Hall: Englewood Cliffs, N.J. 1992 Chapter 3.

Another synthetic route for the production of polyphosphazenes is the Neilson-Wisian-Neilson reaction shown below (Nelson et al., *Chem. Rev.* 1988, 88, 541).

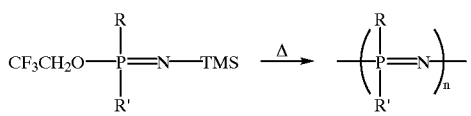

The disadvantages of the Neilson-Wisian-Neilson route include high polymerization temperature, difficult monomer synthesis, the ability to prepare only a limited number of polymers, and little molecular weight control.

The Flindt-Rose Matyjaszewski route for the production of polyphosphazenes involves the following reaction (*Makromol. Chem. Macromol. Symp.* 1992, 54155, 13).

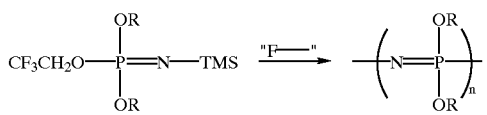

The polymerization temperature of this reaction can be as low as 90° C. The reaction produces polymers with fairly narrow polydispersities (<1.4). The reaction, however, cannot be used to prepare the important synthetic tool poly(dichlorophosphazene). Block copolymers of the type [NP(OR$_1$)$_2$]$_x$[NP(OR$_1$)(OR$_2$)]$_y$, wherein R$_1$ is halogenated alkoxy and R$_2$ is an aliphatic or aryl moiety, can be prepared using this reaction. The synthesis of the monomers necessary for this reaction can be difficult.

Yet another synthetic approach to polyphosphazenes is the Hombacker and Li reaction.

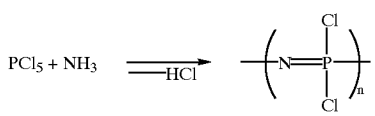

This method requires high temperatures and does not provide control over molecular weight. The products do not have narrow polydispersities.

The DeJaeger synthesis provides poly(dichlorophosphazene)s using the following protocol.

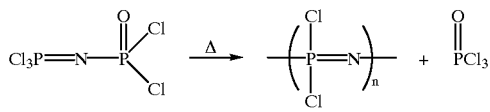

This method allows for some molecular weight control, but cannot produce polymers with narrow polydispersities. Additionally, this route requires high reaction temperatures and the compound $POCl_3$ is very corrosive.

Azides have also been used to prepare polyphosphazenes. For example, $R_2PCl+NaN_3$ yields $-(N=PR_2)-_n$. This route is potentially dangerous because azides are both explosive and toxic. Furthermore this method does not allow molecular weight control and cannot produce poly(dichlorophosphazene).

Thus each of the existing routes for the preparation of polyphosphazenes has one or more disadvantages, including complicated monomer synthesis, difficult polymer synthesis, or elevated polymerization temperatures that allow only limited ranges of polymers to be produced. An important disadvantage of these methods is that it is difficult to prepare or control the molecular weight and polydispersity of the important polymer, poly(dichlorophosphazene). Other polyphosphazenes limited to very specific substituent groups, for example, $[NP(OCH_2CF_3)_2]_n$ can be produced with controlled molecular weights and fairly narrow polydispersities. Polydispersity is a measure of the molecular weight nonhomogeneity of a polymer sample. Polydispersity is calculated by dividing the weight average molecular weight ($M_w$) of the polymer by the number average molecular weight ($M_n$). The value of $M_w/M_n$ is unity for a perfectly monodisperse polymer. The thermal polymerization of hexachlorocyclotriphosphazene, for example; results in a molecular weight of $10^5$–$10^6$ or greater. The polydispersity Index (PDI) for these polymers is typically 2 or higher.

It is known that polymers with narrow polydispersity are easier to crystallize, have a sharper glass transition temperature, and flow more suddenly at a given temperature than the same polymer with a broader polydispersity. The polydispersity of polymers used for drug delivery affects the hydrolytic degradation and release properties of the delivery device. For this reason, the U.S. Food and Drug Administration now requires that polymers for medical applications such as drug delivery have a very narrow polydispersity.

The absolute molecular weight, as opposed to the range of molecular weight, of a polymer sample is also of prime importance in its behavior in industrial and medical applications. Most important mechanical properties vary considerably with weight average molecular weight. For example, strength increases rapidly with increasing molecular weight until a critical point is reached. The ability to process polymers into useful articles such as film, sheet, pipe, or fiber also increases as molecular weight increases to a point, and then decreases past a point as the viscosity becomes too high. Thus it is often desirable to obtain a high but specified, compromise molecular weight that optimizes strength and processability in a concerted fashion. This illustrates the need to control molecular weight during synthesis.

Given the versatility of the route of preparation of polyphosphazenes through substitution reactions with poly(dichlorophosphazene), the development of improved methods for the synthesis of poly(dichlorophosphazene) having low polydispersity and controlled molecular weight is extremely important from both an industrial and an academic viewpoint.

In 1992, it was reported in the Master's Thesis of Charles H. Honeyman (Department of Chemistry, University of Toronto) that the phosphoranimine $Cl_3P=NSi(CH_3)_3$ acted as a monomer for the room temperature neat (i.e., without solvent) synthesis of high molecular weight linear poly(dichlorophosphazene). In a similar fashion, $Cl_2(phenyl)P=NSi(CH_3)_3$ yielded poly(phenylchlorophosphazene), $-[N=P(phenyl)(chloro)]_n-$. Both of these polymers were derivatized via macromolecular substitution reactions with sodium trifluoroethoxide to provide the high molecular weight polymers, $-[N=P(OCH_2CF_3)_2]_n-$ and $-[N=P(Ph)(OCH_2CF_3)]_n-$, respectively. The $-[N=P(Ph)(OCH_2CF_3)]_n-$ produced from poly(dichlorophosphazene) using this process had a PDI of 2.2. This bulk process, however, has provided certain polyphosphazenes with a PDI as low as 1.8. The $-[N=P(Ph)(OCH_2CF_3)]_n-$ produced had a PDI of 1.4. The bulk process cannot produce lower molecular weight polymers with a narrow PDI.

While the Honeyman 1992 process represented an advance in the art of preparation of polyphosphazenes, there remains a need to further narrow the polydispersity of the polymer to approach a monodisperse product. There also remains a need to have a process for the production of polyphosphazenes that allows one to obtain a product of desired molecular weight by the appropriate selection of the starting materials and reaction conditions. Currently, the catalyzed ring-opening polymerization and DeJaeger routes may allow for control of MW but only at high temperatures (above 200° C.) and not with a narrow PDI.

In particular, since the route of preparation of polyphosphazenes through substitution reactions with poly(dichlorophosphazene) appears to be the most useful entry into this class of compounds, it would be of value to have a process that provides low dispersity poly(dichlorophosphazene).

Therefore, it is an object of the present invention to provide a process for the production of polyphosphazenes, and in particular poly(dichlorophosphazene), that results in a product with narrow polydispersity.

It is a further object of the present invention to provide a process for the production of polyphosphazene, and in particular, poly(dichlorophosphazene), which results in the controllable production of polymers of a desired molecular weight.

It is another object of the present invention to provide a process for the production of polyphosphazene block copolymers that results in a product with narrow polydispersity and a desired molecular weight.

It is another object of the present invention to provide a method for the production of poly(dichlorophosphazene) having controlled molecular weight that is conducted under ambient conditions.

It is a still further object of the present invention to provide polyphosphazenes and polyphosphazene block copolymers of narrow polydispersity.

It is a further object of the present invention to provide an ambient temperature synthesis of triarmed star polyphosphazenes.

It is another object of the present invention to provide a process for the synthesis of phosphoranimine monomers and trimers by reacting $NSi(R)_3$ with a phosphorus halide.

SUMMARY OF THE INVENTION

A process for the preparation of polyphosphazenes is provided that includes the cationic solution polymerization reaction of a phosphoranimine, using a main group or transition metal halide, or other appropriate halide salt, including a linear phosphazene salt of any chain length as an initiator. In an alternative embodiment, the initiator is a preformed non-phosphazene polymer containing a main group or transition metal chloride. The initiator is incorporated into the polymer as an endgroup or side group functionality.

Importantly, this general reaction provides a polyphosphazene with narrow polydispersity. It was surprisingly discovered that a reaction of a phosphoranimine with an appropriate halide salt consistently provides a significantly more narrow polydispersity when conducted in solution than when conducted neat (i.e., without a solvent).

This method is a significant advance in the art of polyphosphazene synthesis, in that for the first time, one can specifically control the molecular weight of poly (dichlorophosphazene). The molecular weight of the product is controlled for example, by the monomer to initiator ratio, by the addition of monomer to preformed active or living chains, or by the control of the duration of the reaction. The choice of initiator can influence the polymerization rate which can increase control of molecular weight. This control is only possible in the disclosed solution reaction, and was not possible using the Honeyman 1992 neat synthesis.

Another advantage of this reaction is that the reaction proceeds under mild conditions, typically at ambient temperature. This room temperature synthesis is a significant advance over the prior procedure of the ring opening of a hexachlorocyclotriphosphazene to produce poly (dichlorophosphazene) at 200–250° C. The synthesis allows for the polymerization of monomeric phosphoranimines that contain groups that decompose, rearrange or generate undesired species at elevated temperatures, for example, above 90° C.

The room temperature synthesis can be carried out to achieve 100% conversion of the phosphoranimine to polyphosphazene without crosslinking the product. This can be compared to the ring-opening polymerization of hexachlorocyclotriphosphazene, which typically undergoes crosslinking reactions above 70% conversion, resulting in lower yields of product.

The chain ends in this process are active throughout the duration of the polymerization as well as active after the total consumption of the monomer. By "active" it is meant that the ends are in a reactive state, and specifically, in a cationic state. They are thus available as additional reaction sites for polymerization or derivatization. The chain ends can be deactivated in any appropriate fashion, for example, with an oxygen source or by nucleophiles. The polymer can be reacted with, for example, $SO_3$, NaOR, or $NH_2R$, wherein R is an aliphatic or aromatic group. $SO_3$ can react selectively with the end group to deactivate propagation. NaOR and $NH_2R$ may react with the end group and the polymer chain indiscriminately. However, the use of these compounds in producing polymers makes these convenient choices. Hydride sources may also selectively react with the endgroup. We can also endcap the polymer chain by using phosphoranimine without a functional group (e.g. $R_3P=NSi$ $(Me_3)_3$ where R is alkyl, aryl, alkoxy, or aryloxy).

In one embodiment, a moiety is reacted with the cationic polymer end that contains a second functional group that can be used to link another desired moiety to the polymer. Alternatively, a desired moiety is reacted directly with the cationic polymer end to affect a physical property of the polymer such as solubility, glass transition temperature, lipophilicity, morphology, creep, crystallinity, bulk modulus, viscosity, conductivity, refractive index or thermal stability. In an alternative embodiment, a moiety can be added to the polymer that imparts specific biological properties to the polymer, such as cationic charge (e.g., polylysine or other positive charge bearing species, for tissue adherence)/ or provides a site for the attachment of a biologically active molecule.

Block copolymers of polyphosphazenes can be prepared using at least three different methods. In a first embodiment, a block copolymer is prepared by the cationic polymerization of monomers initiated by the active end groups of the polyphosphazene. Any monomer or polymer capable of reacting with a cationic site can be used. As an example, a block copolymer of polyphosphazene and polyalkylene glycol, for example, polyethylene glycol (PEG), can be prepared through any of the above routes. A PEG endgroup can be used thereafter to polymerize $Cl_3PNTMS$ [TMS= trimethylsilyl] and the resultant polymer can be treated with NaOR to provide any number of desired blocks. The active organic block can be reacted with phosphoranimine monomer, that is the same as or different from that used in the first phosphazene polymer block. This procedure can be continued as long as desired using any variety of reactive organic and phosphoranimine monomers. Blocks should be added prior to substitution of —Cl on the polyphosphazene backbone with a nucleophile, since Cl substitution can deactivate chain ends.

Additionally, other phosphoranimine monomers can be used to create phosphazene-phosphazene blocks. As a non-limiting example, after polymerizing $Cl_3PNTMS$ to $NPCl_2$, $(Ph)Cl_2PNTMS$ can be added to form $[NPCl_2]_x[NP(Ph)Cl]_y$, wherein x and y indicate independent repeating units.

In a second embodiment for the production of block copolymers of polyphosphazenes, functionalized compounds are reacted with the active polyphosphazene end that have a moiety that will initiate a reaction mechanism other than cationic polymerization, for example, anionic or radical initiation. Any initiator that can be attached to the end of a polymer chain and is incorporated into the second block can be used. For example, an endcap with a bromophenyl moiety can be converted to an appropriate organometallic species, for example, a grignard or organolithium reagent, to initiate anionic polymerization of appropriate monomers. Alkene moieties can be used for metathesis reactions. Optionally, at an appropriate time, one can then react the anionic end with a monomer or polymer that has a group capable of initiating cationic polymerization to add another polyphosphazene block. Examples of these monomers include vinyl ether and butadiene. The monomer must undergo a living polymerization to have ABA block formation of phosphazene-organic-phosphazene polymer in this manner.

In a third embodiment for the preparation of block copolymers, initiators for the phosphazene polymerization can be included in other polymer systems. For example, an organic polymer with an $N=PR_3$ endgroup can be used to initiate phosphazene polymerization.

In another embodiment organic polymer/ polyphosphazene block copolymers are prepared by incorporating a short chain ionic species capable of initiating the phosphoranimine $Cl_3P=NSiMe_3$ at the ends of commercially available amine-functionalized organic polymers, such as $NH_2(CH_2CH_2O)_n$—$CH_2CH_2NH_2$. This was then used as a macroinitiator for the development of block poly(phosphazene-ethylene oxide) polymers.

Additionally, star-polyphosphazenes can be prepared using the process of the present invention. In this process a trifunctional cationic species prepared from a trifunctional phosphoranimine is used as the initiator. These polymers have the formula $N\{RN(H)R'_2P-(N=PR'_2)_n\}_3$ wherein R is aliphatic and R' is independently alkyl, alkenyl, alkynyl, aralkyl, alkaryl, aryl, heteroalkyl, or heteroaryl; n is from 10–100,000, preferably 1000–50,000 and most preferably 5,000–20,000.

Finally, the present invention includes the reaction of $N(SiMe_3)_3$ with phosphorus halides as a route to phosphoranimine monomers or trimers. The reaction of $N(SiMe_3)_3$ with $PCl_5$ can be controlled by variation of the reaction conditions to provide either hexachlorocyclotriphosphazene $(N_3P_3Cl_6)$ or phosphoranimine monomer $Cl_3P=NSiMe_3$.

DETAILED DESCRIPTION OF THE INVENTION

I. Definitions

The term biologically active molecule or material as used herein refers to an organic molecule including a drug, a protein, polysaccharide, nucleoprotein, lipoprotein, synthetic polypeptide, or a small molecule linked to a protein, carbohydrate, glycoprotein, steroid, nucleic acid, nucleotide, nucleoside, oligonucleotides (including antisense oligonucleotides), cDNA, nucleic acids, genes, vitamins, including vitamin C and vitamin E, lipid, or combination thereof, that causes a biological effect when administered in vivo to an animal, including but not limited to birds and mammals, including humans. The term drug, as used herein, refers to any substance used internally or externally as a medicine for the treatment, cure, or prevention of a disease or disorder, and includes but is not limited to immunosuppressants, antioxidants, anesthetics, chemotherapeutic agents, steroids (including retinoids), hormones, antibiotics, antivirals, antifungals, antiproliferatives, antihistamines, anticoagulants, antiphotoaging agents, melanotropic peptides, nonsteroidal and steroidal anti-inflammatory compounds.

The term aliphatic, as used herein refers to a hydrocarbon, typically of $C_1$ to $C_{20}$, that can contain one or a combination of alkyl, alkenyl, or alkynyl moieties, and which can be straight, branched, or cyclic, or a combination thereof. A lower aliphatic group is typically from $C_1$ to $C_5$.

The term alkyl, as used herein, unless otherwise specified, refers to a saturated straight, branched, or cyclic, primary, secondary, or tertiary hydrocarbon, preferably of $C_1$ to $C_{20}$, and specifically includes methyl, ethyl, propyl, isopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, and 2,3-dimethylbutyl. The alkyl group can be optionally substituted with one or more moieties selected from the group consisting of hydroxyl, amino, alkylamino, arylamino, alkoxy, aryloxy, nitro, cyano, sulfonic acid, sulfate, phosphonic acid, phosphate, or phosphonate, either unprotected, or protected as necessary, as known to those skilled in the art, for example, as taught in Greene, et al., "Protective Groups in Organic Synthesis," John Wiley and Sons, Second Edition, 1991. The term lower alkyl refers to an alkyl group of $C_1$ to $C_5$.

The term alkylamino or arylamino refers to an amino group that has one or two alkyl or aryl substituents, respectively.

The term "protected" as used herein and unless otherwise defined refers to a group that is added to an oxygen or nitrogen atom to prevent its further reaction during the course of derivatization of other moieties in the molecule in which the oxygen or nitrogen is located. A wide variety of oxygen and nitrogen protecting groups are known to those skilled in the art of organic synthesis.

The term amino acid as used herein, refers to a natural or synthetic amino acid, and includes, but is not limited to alanyl, valinyl, leucinyl, isoleucinyl prolinyl, phenylalaninyl, tryptophanyl, methioninyl, glycinyl, serinyl, threoninyl, cysteinyl tyrosinyl, asparaginyl, glutaminyl, aspartoyl, glutaoyl, lysinyl, argininyl, and histidinyl. The term amino acid ester refers to the aliphatic, aryl or heteroaromatic carboxylic acid ester of a natural or synthetic amino acid.

The term aryl, as used herein, and unless otherwise specified, refers to phenyl, biphenyl, or naphthyl, and preferably phenyl. The aryl group can be optionally substituted with one or more moieties selected from the group consisting of hydroxyl, amino, alkylamino, arylamino, alkoxy, aryloxy, nitro, cyano, sulfonic acid, sulfate, phosphonic acid, phosphate, or phosphonate, either unprotected, or protected as necessary, as known to those skilled in the art, for example, as taught in Greene, et al., "Protective Groups in Organic Synthesis," John Wiley and Sons, Second Edition, 1991.

The term halo, as used herein, includes chloro, bromo, iodo, and fluoro.

The term heteroaryl or heteroaromatic, as used herein, refers to an aromatic moiety that includes at least one sulfur, oxygen, or nitrogen in the aromatic ring. Non-limiting examples are furyl, pyridyl, pyrimidyl, thienyl, isothiazolyl, imidazolyl, tetrazolyl, pyrazinyl, benzofuranyl, benzothiophenyl, quinolyl, isoquinolyl, benzothienyl, isobenzofuryl, pyrazolyl, indolyl, isoindolyl, benzimidazolyl, purinyl, carbozolyl, oxazolyl, thiazolyl, isothiazolyl, 1,2,4-thiadiazolyl, isooxazolyl, pyrrolyl, quinazolinyl, pyridazinyl, pyrazinyl, cinnolinyl, phthalazinyl, quinoxalinyl, xanthinyl, hypoxanthinyl, pteridinyl, 5-azacytidinyl, 5-azauracilyl, triazolopyridinyl, imidazolopyridinyl, pyrrolopyrimidinyl, pyrazolopyrimidinyl, adenine, $N^6$-alkylpurines, $N^6$-acylpurines (wherein acyl is C(O) (alkyl, aryl, alkaryl, or aralkyl)), $N^6$-benzylpurine, $N^6$-halopurine, $N^6$-vinylpurine, $N^6$-acetylenic purine, $N^6$-acyl purine, $N^6$-hydroxyalkyl purine, $N^6$-thioalkyl purine, thymine, cytosine, 6-azapyrimidine, 2-mercaptopyrimidine, uracil, $N^5$-alkylpyrimidines, $N^5$-benzylpyrimidines, $N^5$-halopyrimidines, $N^5$-vinylpyrimidine, $N^5$-acetylenic pyrimidine, $N^5$-acyl pyrimidine, $N^5$-hydroxyalkyl purine, and $N^5$-thioalkyl purine, and isoxazolyl. Functional oxygen and nitrogen groups on the heterocyclic base can be protected as necessary or desired during the reaction sequence.

Suitable protecting groups are well known to those skilled in the art, and include trimethylsilyl, dimethylhexylsilyl, t-butyldimethylsilyl, and t-butyldiphenylsilyl, trityl, alkyl groups, acyl groups such as acetyl and propionyl, methylsulfonyl, and p-toluylsulfonyl.

The term alkylheterocyclic or alkylheteroaromatic refers to a moiety in which the alkyl group is covalently attached to the heteroaromatic, is preferably $C_1$ to $C_4$ alkylheteroaromatic, and more preferably $CH_2$-heteroaromatic.

The term aralkyl, as used herein, refers to an aryl group with an alkyl substituent.

The term alkoxy, as used herein, and unless otherwise specified, refers to a moiety of the structure —O-alkyl.

The term alkynyl, as referred to herein, refers to a $C_2$ to $C_{10}$ straight or branched hydrocarbon with at least one triple bond.

The term protected-oxy refers to an oxygen atom that has been protected from undesired reactions with any of the oxygen protecting group known to those skilled in the art, including but not limited to, for example, a trisubstituted silyl group such as trimethylsilyl, dimethylhexylsilyl, t-butyldimethylsilyl, t-butyldiphenylsilyl, trityl, alkyl group, acyl groups such as acetyl, propionyl, benzoyl, p-$NO_2$ benzoyl, toluyl, methylsulfonyl, or p-toluylsulfonyl.

The term heteroalkyl, as used herein, refers to an alkyl group that includes a heteroatom such as oxygen, sulfur, or nitrogen (with valence completed by hydrogen or oxygen) in the carbon chain or terminating the carbon chain. Examples of these compounds include a series of lower alkyls interrupted by a heteroatom such as oxygen, sulfur or nitrogen, including —O—[(alkyl)O]$_x$—$CH_2$)$NH_2$, wherein the alkyl group can vary within the moiety, including —O—[($CH_2$)$_x$ O]$_y$—$CH_2$)$_x$$NH_2$; —O—[($CH_2$)$_x$O]$_y$$CH_2$)$_x$$NH(CH_2$)$_x$ $SO_3$H, and —O—[(alkyl)—O]$_y$—(alkyl), wherein the alkyl group can vary within the moiety, including —O—[($CH_2$)$_x$ O]$_y$—(alkyl), wherein x is 1–8 (which can vary within the moiety) and y is an integer of 1 to 40. Specific examples of these compounds include (methoxyethoxy)ethoxy, ethoxyethoxy and methoxyethoxy. The heteroalkyl groups can also be halogenated such as —$OCH_2CF_3$ and the like.

A process for the preparation of polyphosphazenes is provided that includes the cationic solution polymerization reaction of a phosphoranimine, using a main group or transition metal halide, or other appropriate halide salt, including a linear phosphazene salt of any chain length as an initiator.

This process represents a significant advance in the art of synthesis of polyphosphazenes, in that it provides a new degree of control over the molecular weight of the product, and provides a product with narrow polydispersity. Poly (dichlorophosphazene) with a polydispersity of 1.6 or less (for example, 1.4, 1.2, 1.1, or 1.05 or less), and corresponding poly(organophosphazenes) with a polydispersity of 1.2 (for example 1.1 or 1.05) or less can be prepared using this method.

This invention is disclosed in the following detailed description, and is illustrated in the working examples. The working examples are merely illustrative of selected specific embodiments of the invention, and are not intended to be construed to limit its scope. Given the disclosure, one of ordinary skill in the art can routinely modify the process as necessary or desired. All of these modifications are considered to fall within the scope of the present invention.

II. Selection of Phosphoranimine

A phosphoranimine is used as the monomer in the preparation of the polyphosphazene. In a preferred embodiment, the phosphoranimine is of the structure: $R_3P=NSi(R')_3$ wherein at least one R substituent is chloro, fluoro, bromo, or iodo, and preferably chloro, and the remaining R and R' substituents are any groups that do not contain functional moieties that would adversely affect the polymerization process.

In a preferred embodiment, at least two R substituents are halo, and preferably chloro. A preferred phosphoranimine is trichloro(trimethylsilyl)phosphoranimine, $Cl_3P=NSiMe_3$. Examples of moieties that do adversely affect the polymerization process include —NH, —OH, acidic groups, bases, labile fluorine atoms, organolithium reagents and grignard reagents. At least some of these moieties can be converted into noninterfering groups by conventional protection, followed by deprotection at an appropriate time. The interfering groups are typically those that react with the propagating end group, presumably the $PCl_3^+ \cdot PCl_6^-$ unit.

In one embodiment, R is independently (and protected as necessary) chloro, bromo, iodo, aliphatic, including alkyl, alkenyl, or alkynyl; aralkyl, alkaryl, aryl, heteroalkyl, heteroaryl, cyano, amino acid ester, carboxylic acid ester, -oxyaryl including but not limited to -oxyphenyl-p-methyl, protected -oxyphenyl$CO_2$H, protected -oxyphenyl$SO_3$H, -oxyphenylhydroxyl and -oxyphenyl$PO_3$H; oxyaliphatic, including -oxyalkyl, -oxy(aliphatic)$CO_2$H, -oxy(aliphatic) $SO_3$H, -oxy(aliphatic)$PO_3$H, and -oxy(aliphatic)hydroxyl, including -oxy(alkyl)hydroxyl; -oxyalkaryl, -oxyaralkyl, -thioaryl, -thioaliphatic including -thioalkyl, -thioalkaryl, aliphatic and aryl ketone, phosphine oxide or phosphoryl compound (P=O), ether, sulfone and sulfoxide.

If the R group attached to the phosphorus atom is bulky, it may affect the tacticity of the polymer. For example, one may obtain a syndiotactic or isotactic polyphosphazene by appropriate selection of the R group. Bulky groups such as aryl or napthyl groups may polymerize in a syndiotactic arrangement. The large groups may preferentially alternate the side of the phosphorus they are on to minimize steric interactions.

R' is preferably independently aliphatic, preferably lower alkyl, aryl, aralkyl, or alkaryl. In a preferred embodiment, R' is lower alkyl. Non-limiting examples of the —Si(R')$_3$ moiety include trimethylsilyl, triphenylsilyl, aryldialkylsilyl, and t-butyldimethylsilyl.

During the reaction, one of the R groups on the phosphorus of the phosphoranimine, typically a halogen such as chlorine, will be removed and the remaining two R groups on the phosphorus atom will become the substituents on the resulting polyphosphazene. For example, if a —$PCl_3$ moiety is present in the phosphoranimine, a poly (dichlorophosphazene) will be produced. If, for example, a —$PCl_2$ alkyl or —$PCl_2$aryl group is present, a —[N=P(Cl (alkyl)]$_n$- or -[N=P(Cl (aryl)]$_n$—, respectively, will be produced.

A phosphoranimine should be selected that is stable to trimerization. If the substituent groups are collectively too large, a trimer is favored over a polymer. However, if the initiator is a linear phosphazene longer than three repeat units, the molecule cannot trimerize. However, under certain circumstances, it is possible that initiators of this size can inhibit polymerization.

In one embodiment, at least one R' group is selected that is chiral, to promote chiral polymerization. If the anion is chiral and maintains a close association with the chain end, the anion may affect the tacticity of the polymer chain. An example is $PCl_4R^*$ where R is chiral. The phosphoranimine is Cl(R)(R')P=NTMS, where R does not equal R'.

Phosphoranimines can be prepared according to known methods, for example, as described in Honeywell's 1992 Master's Thesis; Honeyman, et al, *Inorg. Chem.*, 1994, 33, 2988; and Niecke, et al., *Inorg. Nucl. Chem. Lett.*, 1973, 9, 127.

III. Selection of Initiator

The polymerization initiator is a cationic species that contains a halide counterion, preferably chloride, that will facilitate the removal of —Si(R')$_3$ from the phosphoranimine. In one embodiment, the reaction initiator is a main group or transition metal halide, or other appropriate halide salt. For example, the initiator can be MX$_n$Y$_m$ or EX$_n$Y$_m$, wherein M is a transition metal element (including but not limited to V, Cr, Zr, Nb, Hf, Ta, W, Mo, Mn, Fe, Ru, Os, Co, Rh, Ir, Ni, D Pd, Pt, Cu, Zn, Cd and Hg), E is a main group element (including, but not limited to P, Si, As, Sb and Ge), X is a halide, Y is any inorganic or organic substituent that does not adversely affect the initiation or polymerization reaction (including but not limited to aliphatic such as alkyl, and aryl), n is 1 to the valence state of M or E, and m is the valence state minus n. For example, in phosphorous pentachloride (PCl$_5$), the valence state of phosphorous is 5, and in WX$_6$, the valence state of W is 6. Examples are PCl$_5$, TiCl$_4$ (which may lead to branched polymers), TaCl$_5$ (slower than PCl$_5$), SO$_2$Cl$_2$, AlCl$_3$, VCl$_4$, BF$_3$, SnCl$_4$, SbCl$_5$, ZnCl$_4$, (Ph)$_3$CPF$_6$, (Ph)$_3$CSbF$_6$, (Ph)$_3$CPCl$_6$, (Ph)$_3$CSbCl$_6$, oxyhalides such as POCl$_3$, CrO$_2$Cl, SOCl$_2$, and VOCl$_3$. Non-limiting examples of linear phosphazene salts that can be used as initiators are Cl$_3$P=N—PCl$_3$$^+$A$^-$, wherein A is any counteranion that does not adversely affect the reaction (including but not limited to halo, PX$_6$$^-$), and preferably chloride or PCl$_6$$^-$; and (R)Cl$_2$P=N—(PCl$_3$)$^+$A$^-$, for example, RCl$_2$P=N—PCl$_3$$^+$PCl$_6$$^-$.

In an alternative embodiment, a linear phosphazene salt is used as an initiator that is in itself an oligomer. For example, the salt [Cl$_3$P=N—PCl$_3$]$^+$[PCl$_6$]$^-$ can be reacted with a selected ratio of equivalents of Cl$_3$P=NSiMe$_3$ to produce longer cationic P—N chains. Linear phosphazene salts of seven monomeric units are typically the highest in the oligomer series that can be obtained as single products. Above this, mixtures of 9 and 11, or 11 and 13, or 11, 13 and 15 member chains are typically obtained. The series of addition reactions leads to a clean stepwise synthesis of various P-N salts by the elimination of ClSiMe$_3$. To obtain the 3, 5 and 7 member chains, one equivalent at a time is added. However, to obtain larger chains, all of the equivalents can be added at once. Other oligomeric phosphazene salts, such as [RCl$_2$P=N—PCl$_3$$^+$]$^{A+}$ and R$_3$P—[N=P(R')$_2$]$_z$N=PR'$_2$Cl$^+$A$^-$ where z is 1–7 can be prepared analogously. The use of a linear oligomeric phosphazene salt as an initiator represents one method for the preparation of a polyphosphazene block copolymer.

Among the advantages of the use of a linear phosphazene salt is that it is easier to purify and easier to functionalize than metal salts. Further, the solubility of the phosphazene salt can be increased by increasing the chain length as desired.

EXAMPLE 1

Preparation of Trichloro(trimethylsilyl) phosphoranimine

The synthesis of trichloro(trimethylsilyl) phosphoranimine Cl$_3$P=N—SiMe$_3$ is reported in Honeyman, C *Route to New Inorganic Rings and Polymers; The Reactions of Cl$_2$RP=NSiMe$_3$, (R=Cl or Ph) with Main Group and Transition Metal Chlorides* MS Thesis, Department Of Chemistry, University of Toronto, 1992. The synthesis involves the dropwise addition of a single equivalent of LiN(SiMe$_3$)$_2$ in hexanes to a vigorously stirred cold (−78° C.) slurry of PCl$_5$ in hexane. A major challenge was the need to obtain Cl$_3$P=N—SiMe$_3$ in high purity. The monomer formed by this route did not polymerize in a reproducible manner when treated with trace amounts of PCl$_5$ in CH$_2$Cl$_2$. $^1$H NMR spectra and mass spectrometry (CI—MS revealed the presence of (Me$_3$Si)$_2$NCl as a side product. This species appears to inhibit polymerization. Multiple distillations did not remove (Me$_3$Si)$_2$NCl because this compound distills at a similar temperature and pressure to Cl$_3$P=N—SiMe$_3$. Pure Cl$_3$P=N—SiMe$_3$ was obtained by treatment of the mixture with PPh$_3$ (in an excess or stoichiometric amount relative to (Me$_3$Si)$_2$NCl in CH$_2$Cl$_2$ to form Ph$_3$P=NSiMe$_3$ and Me$_3$SiCl. The resultant mixture was then distilled at reduced pressure to yield pure Cl$_3$P=N—SiMe$_3$. Purification of the reaction products by distillation gives the product as a clear, colorless, moisture sensitive liquid distillate.

Alternatively, to avoid the additional purification step, Cl$_3$P=N—SiMe$_3$ has also been obtained from the reaction of PCl$_5$ with N(SiMe$_3$)$_3$ in hexane at −78° C. Although this synthesis generated no (Me$_3$Si)$_2$NCl impurity, the yields of Cl$_3$P=N—SiMe$_3$ produced via this route have not been optimized.

EXAMPLE 1a

Reaction of N(SiMe$_3$)$_3$ with PCl$_5$ to form Cl$_3$P=NSiMe$_3$.

Tris(trimethylsilyl)amine was synthesized as previously reported in the literature. Chlorotrimethylsilane was added slowly to lithium bis(trimethylsilyl amide) in tetrahydrofuran stirred with a magnetic stirrer and cooled with an ice bath. After all of the chlorotrimethylsilane was added, the reaction was heated to reflux for 48 hours. After the reaction cooled to room temperature, the LiCl formed was filtered using an airless fritted funnel. The solvent was evaporated under reduced pressure using a dry ice/acetone trap. The remaining solid was then sublimed to give a clear colorless product.

Phosphorus pentachloride (22.29 g) was stirred in hexane (300 mL) at 0° C. Tris(trimethylsilyl) amine (25.00 g) dissolved in hexane (200 mL) was added to the solution dropwise. The reaction was allowed to slowly warm to room temperature, stirred for 24 h, and filtered. Fractional distillation of the filtrate at room temperature and reduced pressure provided Cl$_3$P=NSiMe$_3$ in a 30% yield.

EXAMPLE 1b

Reaction of N(SiMe$_3$)$_3$ with PCl$_5$ to form N$_3$P$_3$Cl$_6$.

Tris(trimethylsilyl) amine (34.00 g) was dissolved in dichloromethane (300 mL), stirred with a magnetic stirrer, and heated to reflux. Phosphorus pentachloride (30.31 g) dissolved in dichloromethane (300 mL) was added to the solution dropwise. After all of the solution had been added, the solvent was removed under vacuum to provide a solid material that was 76% trimer, 4% tetramer, 3% pentamer, and 13% higher cyclics and oligomers.

In order to promote the formation of trimer N$_3$P$_3$Cl$_6$, the key is to add PCl$_5$ to N(SiMe$_3$)$_3$ very slowly at reflux in a polar solvent, such as methylene chloride, to allow the linear Cl$_3$PNP(Cl)$_2$NPCl$_3$$^+$PCl$_6$$^-$ salt to react with N(SiMe$_3$)$_3$ to form the cyclic trimer. If $PCl_5$ is added too quickly, the thermodynamically favorable tetramer becomes the primary product.

EXAMPLE 2

Preparation of Dichloro(phenyl) (trimethylsilyl) phosphoranimine $$Cl_2PhP\!\!=\!\!N\!\!-\!\!SiMe_3$$

The procedure used to prepare this compound was analogous to that described in Example 1 for $Cl_3P\!\!=\!\!N\!\!-\!\!SiMe_3$ except as follows. To tetrachlorophenylphosphorane (80 g, 0.32 mol) in hexanes (1000 ml) at $-78°$ C. was added dropwise a solution of lithium bistrimethylsilyl)amide, LiN $(SiMe_3)_2$ (53 g, 0.32 mol) in hexanes (500 ml) with mechanical stirring. The clear, colorless product was distilled (bp $53°$ C., 0.02 mm Hg) and was identified as $Cl_3PhP\!\!=\!\!N\!\!-\!\!SiMe_3$. Yield 47.0 g (55%). $^{31}P$ NMR $(CH_2Cl_2)$ $\Delta$-11.8 ppm; $^{13}C$ NMR $(CDCl_3)$ $\Delta$133.2 ppm $(\Delta, {}^4J_{CP}\!\!=\!\!4$ Hz, p-Ph), $\Delta$130.7 ppm $(\Delta, {}^3J_{CP}$-13 Hz, m-Ph), $\Delta$128.7 ppm $(\Delta^2J_{CP}\!\!=\!\!19$ Hz, o-Ph), $\Delta$1.9 PPM $(\Delta, {}^4J_{CP}\!\!=\!\!7$ Hz, $CH_3$), ipso-Ph not observed; $^1H$ NMR $(CDCl_3)$d 8.0 ppm $(\Delta,$ of $\Delta, {}^3J_{HP}\!\!=\!\!19$ Hz, $^2J_{HH\,(om)}\!\!=\!\!$Hz, 2 H, o-Ph), $\Delta$, 7.5 ppm (br., 3 H, p-and m-Ph), $\Delta$0.2 ppm $(\Delta, {}^4J_{HP}\!\!=\!\!3$ Hz, 9 H, $CH_3$).

EXAMPLE 3

Preparation of $[Cl_3P\!\!=\!\!N\!\!-\!\!PCl_3][PCl_6]$ By Reaction of 2 Equivalents of $PCl_5$ with 1 Equivalent of $Cl_3P\!\!=\!\!N\!\!-\!\!SiMe_3$ Two equivalents of phosphorus pentachloride (3.6 g, 17 mmol) were dissolved in dichloromethane (50 ml) and the resulting stirred solution was cooled to $-78°$ C. A single equivalent of $Cl_3P\!\!=\!\!N\!\!-\!\!SiMe_3$ (2.0 g, 9 mmol) was added quickly to the syringe and the reaction mixture was immediately allowed to warm to room temperature. The solvent was removed in vacuo resulting in a fine white powder which was identified as $[Cl_3P\!\!=\!\!N\!\!-\!\!PCl_3][PCl_6]$. Yield 4.3 g (90%). $^{31}P$ NMR $(CH_2Cl_2)$ $\Delta$22.4 ppm $(\!\!=\!\!PCl_3)$, $\Delta$—293.6 $([PCl_6]^-)$.

EXAMPLE 4

Preparation of $[Cl_3P\!\!=\!\!N\!\!-\!\!PCl_2\!\!-\!\!N\!\!=\!\!PCl_3]^+$ $[PCl_6]^-$ By Reaction of 1

Equivalent of $[Cl_3P\!\!=\!\!N\!\!-\!\!PCl_3]^+[PCl_6]^-$ with 1 Equivalent of $Cl_3P\!\!=\!\!N\!\!-\!\!SiMe_3$ The salt $[Cl_3P\!\!=\!\!N\!\!-\!\!PCl_3]^+ [PCl_6]^-$ (1.5 g, 3 mmol) was dissolved in dichloromethane (50 ml) and the resulting stirred solution was cooled to $-78°$ C. $Cl_3P\!\!=\!\!N\!\!-\!\!SiMe_3$ (2.0 g, 9 mmol, leq.) was added quickly by syringe and the reaction mixture was immediately allowed to warm to room temperature. The solvent was removed in vacuo resulting in a fine white powder which was identified as $[Cl_3P\!\!=\!\!N\!\!-\!\!PCl_2\!\!-\!\!N\!\!=\!\!PCl_3]^+ [PCl_6]^-$. Yield 1.8 g (92%). $^{31}P$ NMR $(CH_2Cl_2)$ $\Delta$14.6 ppm (d, $^2J_{PP}$ 45 Hz)$=\!\!PCl_3$, $\Delta$–10.5 ppm (t, $^2J_{PP}$ 45 Hz) —$PCl_2$,—, $\Delta$—293.6 ppm $[PCl_6]^-$.

IV. Conditions of Polymerization

The disclosed route for the preparation of polyphosphazenes provides an opportunity for control over polymer molecular weight and structure, and allows access to polyphosphazenes with narrow polydispersities. The synthetic route described herein can produce products ranging from oligomers to high molecular weight polymers. A typical molecular weight range of the polymers is between approximately $10^3$ and $10^6$, but others outside this range can also be prepared. Importantly, the process can be carried out at or near ambient temperatures.

The route described herein for the preparation of polyphosphazenes is considerably less complicated and less expensive in terms of the chemicals required and the temperatures needed than any of the alternatives currently available. Moreover, the relative ease of preparation and the access to new polyphosphazenes are of fundamental importance in the field of polyphosphazene chemistry both academically and industrially.

This method allows for the recycling of $ClSiMe_3$, which is important economically and environmentally. This, together with the large scale availability of the starting materials $ClSiMe_3$ and $PCl_5$ or $RPCl_4$ offers favorable prospects for the large scale synthesis of polyphosphazenes and for a marked expansion in the availability and utility of poly(phosphazenes).

The procedure for carrying out the solution reaction is quite simple and easy to accomplish on a manufacturing scale. The selected phosphoranimine is mixed with solvent, and then a small amount of initiator is added, and the solution is stirred.

It is important that the reaction mixture be a homogeneous solution in order to obtain a narrow PDI. The initiator, and phosphoranimine, initial oligomers formed and polymer product should be soluble to maintain molecular weight control and a narrow PDI. Therefore, solubility limits the choice of monomer and initiator. It is preferable to pretreat glass or glass-lined reaction vessels with a silating reagent such as $ClSiMe_3$ prior to running the reaction.

The reaction is carried out in any organic solvent that does not adversely affect the polymerization reaction, i.e., it must be inert under the conditions of reaction. It should also be dry. Dichloromethane and other halogenated inert solvents are preferred solvents for the solution synthesis of poly (dichlorophosphazene). Other suitable solvents include, but are not limited to, glyme, diglyme, toluene, acetonitrile, dioxane, and cyclohexane.

The choice of solvent will affect the molecular weight distribution of the product. If dioxane is used, multimodal GPC traces can be obtained. If too little solvent is used (for example, not enough to bring all of the reactants into solution) the polymerization can resemble that occurring under neat (i.e., bulk) conditions with resulting multimodal GPC traces.

The reaction can be carried out at any desired temperature that does not unduly affect the reactants or product. Importantly, most of the polymerization reactions do not require heat at all. The reaction is typically carried out at a temperature ranging between 20 and $23°$ C.

The molecular weight of the product can be controlled, for example, by the choice of initiator, the monomer/initiator ratio, by the addition of monomer to preformed active or living chains, or by the control of the time of the reaction.

Any ratio of phosphoranimine to initiator can be used that provides the desired product. In one embodiment, between 100 and 5 moles of monomer to 1 mole of initiator are used, and preferably, between 20 and 5 moles of monomer. As the ratio of initiator to phosphoranimine increases, the molecular weight of the product decreases. $PCl_5$ and $Cl_3PNPCl_3^+$ $A^-$ are preferred initiators.

The reaction is carried out for any amount of time that provides the desired product. In general, reaction times of between approximately 6 and 24 hours are typical, however, the polymerization reaction may be complete in under two hours.

The reaction can be carried out at ambient pressure or reduced pressure, in air or in an inert atmosphere such as $N_2$, as appropriate for the starting material and product.

The control over molecular weight and the very narrow polydispersity that can be obtained using this method distinguishes it from the corresponding bulk (i.e., without solvent) method, as described in more detail in Example 5.

EXAMPLE 5

Comparison of Bulk and Solution Polymerization of Phosphoranimine

It was postulated that the treatment of $Cl_3P=NSiMe_3$ with trace quantities of $PCl_5$ might afford high molecular weight poly(dichlorophosphazene), and that control over the ratio of the phosphoranimine to $PCl_5$ might allow for the control of the molecular weight of the polymer produced. The addition of trace $PCl_5$ (ca 10 mg) to pure $Cl_3P=NSiMe_3$ (1.0 g) at room temperature led after 5 days to the formation of a two-phase mixture. Both phases were clear and colorless but the upper more fluid layer, was found, by $^1H$ NMR spectroscopy to consist mainly of $Me_3SiCl$. A $^{31}P$ NMR spectrum of the entire tube contents showed predominantly a sharp singlet characteristic of poly (dichlorophosphazene). Thus, the conversion of $Cl_3P=NSiMe_3$ to linear polymer was essentially quantitative. The poly(dichlorophosphazene) product was treated with an excess of $NaOCH_2CF_3$, and the resultant polymer gave a $^{31}P$ NMR signal characteristic of a well known polymer, $[N=P(OCH_2CF_3)_2]_n$. Analysis of this polymer by gel permeation chromatography (GPC) indicated that it possessed only a high molecular weight fraction having $M_w=2.1 \times 10^5$ and a polydispersity index $(PDI=M_w/M_n)=1.8$ versus polystyrene standards. However, in subsequent attempts to obtain lower molecular weight poly (dichlorophosphazene) by increasing the ratio of $PCl_5$ to monomer with the same solvent-free conditions, the initiator and initial cationic products remained primarily insoluble. The molecular weight values of the polymers produced were lower than in the above experiment, but the GPC trace of this polymer was multimodal. The results suggested a lack of molecular weight control in the solvent-free system due to the heterogeneous nature of the process.

In contrast, the reaction of $Cl_3P=NSiMe_3$ with traces of $PCl_5$ in a methylene chloride solution resulted in a quantitative conversion to poly(dichlorophosphazene) (as estimated by $^{31}P$ NMR spectroscopy and GPC analysis of the trifluoroethoxy derivatives $[N=P(OCH_2CF_3)_2]_n$) with a very narrow polydispersity. An increase in the ratio of phosphoranimine to $PCl_5$ in solution resulted in an increase in the molecular weight while still retaining narrow PDI values, as indicated in Table 1 below.

TABLE I

| Sample | $PCl_5$ | $Cl_3P = NSiMe_3$ | Mon/Init | $M_w$ | PDI |
|---|---|---|---|---|---|
| Bulk 1 | ~10 mg | 1.0g | 100 | 21000 | 1.8 |
| Bulk 2 | 110 mg | 1.6g | 14.5 | 41000 | 2.3* |
| Solution 3 | 200 mg | 1.0g | 5 | 7000 | 1.20 |
| Solution 4 | 100 mg | 1.0g | 10 | 11000 | 1.04 |
| Solution 5 | 29 mg | 0.6g | 21 | 14000 | 1.04 |

*multimodal GPC trace

The analogous reaction between a trace of $PCl_5$ and $PhCl_2P=NSiMe_3$ in the bulk state at room temperature also yielded a polymeric product. In this case the polymerization resulted in the formation of poly[aryl(chloro)phosphazene], $[N=P(Ph)Cl]_n$ which was converted to the known macromolecule $[N=P(Ph)(OCH_2CF_3)]_n$ with $M_n=8.0 \times 10^4$ and polydispersity of 1.4. An investigation into the effect of monomer to initiator ration of the molecular weight polymerization of $Cl_3P=N-SiMe_3$ was conducted. The results (see Table II below) show an increase in the ratio of phosphoranimine to $PCl_5$ in solution brought about an increase in the molecular weight, while still retaining narrow PDI values.

TABLE II

| M:I | $M_n \times 10^{-3}$ Found[a] | $M_n \times 10^{-3}$ Calculated[b] | PDI |
|---|---|---|---|
| 4.6:1 | 5.8 | 2.5 | 1.20 |
| 9.3:1 | 10.6 | 5.0 | 1.04 |
| 23:1 | 20.2 | 12 | 1.09 |
| 46:1 | 53.0 | 24 | 1.32 |
| 70:1 | 66.4 | 36 | 1.25 |

[a]Obtained by GPC vs polystyrene standards.
[b]Calculated from the initial ratio of monomer to $PCl_5$ initiator.

EXAMPLE 6

Preparation of Poly(dichlorophosphazene) from Trichloro(trimethylsilyl)phosphoranimine The solution polymerization of trichloro(trimethylsilyl) phosphoranimine was carried out according to the following general procedure. All glassware was pretreated with 5% $ClSiMe_3$ in hexanes and dried under vacuum. The $Cl_3P=NSiMe_3$ was sublimed prior to use and stored under nitrogen. A solution of $PCl_5$ (100 mg) in $CH_2Cl_2$ (10 mL) was added to a stirred solution of $Cl_3P=NSiMe_3$ (1.0 g, 4.4 mol) in $CH_2Cl_2$ (35 mL) under nitrogen. The solution was stirred for 24 hours. The products were analyzed by $^{31}P$ NMR.

The analyses were performed using the techniques and instruments set forth below. $^1H$ NMR (360.0 MHz), $^{13}C$ NMR (90.0 20 MHz), and $^{31}P$ NMR (145.8 MHz) spectra were obtained using a Bruker WM-360 MHz spectrometer. Chemical shifts are relative to tetramethylsilane at $\delta=0$ for proton and carbon. The phosphorus chemical shifts are relative to 85% $H_3PO_4$ at $\delta=0$, with positive shift values downfield from the reference. All heteronuclear NMR spectra were proton decoupled.

Molecular weights were determined using a Hewlett Packard HP 1090 gel permeation chromatograph equipped with an HP1037A refractive index detector and Polymer Laboratories PL gel 10 μm columns. The samples were eluted with a 0.1% by weight solution of tetra-n-butylammonium bromide in THF. The GPC column was calibrated with polystyrene standards (Waters) the results are provided in Table 1.

EXAMPLE 7

Preparation of Polychloro(phenyl)phosphazene from Dichloro(phenyl)(trimethylsilyl) phosphoranimine Polychloro(phenyl)phosphazene was prepared according to the bulk polymerization method described in Example 5, using $Cl_2PhP=NSiMe_3$ instead of $Cl_3P=NSiMe_3$. Treatment of this polymer with sodium trifluoroethoxide resulted in a polymer identical with literature reports. The weight average molecular weight was $3.0 \times 10^4$ and the polydispersity ($M_w/M_n$) was 1.4.

EXAMPLE 7a

Evidence for Macrocondensation

Samples of poly(dicholorophosphazene) that were not subjected to halogen replacement immediately following complete conversion of monomer, but instead were maintained for several days at 25° C. before being substituted, showed a change in molecular weight distribution. GPC chromatograms consisted not of a single sharp peak as expected, but a peak with a higher molecular weight shoulder. The shoulder corresponded to approximately twice the molecular weight of the original peak. This occurred for several monomer to initiator ratios, and suggested a macrocondensation reaction in which two polymer chains join together to form a single polymer of twice the molecular weight. In order to study this phenomenon, a polymerization experiment was conducted with a 23:1 I:$PCl_5$ ratio sample. The polymerization solution was divided into two equal parts. The first sample was treated with $NaOCH_2CF_3$ in dioxane immediately after conversion of the monomer to polymer. The GPC chromatogram of this substituted polymer 2 contained one sharp peak that corresponded to values of $M_n=2.0 \times 10^4$ and PDI=1.09. The second sample was not substituted, but was stirred at 25° C. for 20 days in the $[N=PCl_2]_n$ form. It was then treated with $NaOCH_2CF_3$ in dioxane to produce polymer with $M_n=2.2 \times 10^4$ and PDI= 1.17. However, the GPC chromatogram of this polymer had an additional high molecular weight shoulder at approximately twice the molecular weight of the first polymer. This suggests that $[N=PCl_2]_n$ macrocondensation can occur over time. A possible mechanism for this process is hydrolytic coupling of two polymer chains to give a macromolecule with a molecular weight twice that of the original. Another possibility is the coupling of two neutral chain ends ($Cl_3P=N-$) to form a dimeric species. Thus, in order to obtain controlled molecular weight polymers, it is essential to substitute the polymer immediately after complete conversion of monomer or to store the material at temperatures below 0° C.

V. Endcaps

The chain ends of the growing polymer in this process are active throughout the duration of the polymerization as well as active after the total consumption of the monomer. By "active" it is meant that the ends are in a reactive state, and specifically, in a cationic state. They are thus available as additional reaction sites for polymerization or derivatization.

In one embodiment, a desired moiety is reacted with the cation polymer end to affect a physical property of the polymer such as solubility, glass transition temperature, lipophilicity, morphology creep, crystallinity, bulk modulus, viscosity, conductivity, refractive index or thermal stability. The chain ends can be deactivated in any appropriate fashion, for example, with an oxygen source or by nucleophiles. The polymer can be reacted with for example, $SO_3$, NaOR, or $NH_2R$, wherein R is an aliphatic or aromatic group. $SO_3$ can react selectively with the end group to deactivate propagation. NaOR and $NH_2R$ may react with the end group and the polymer chain indiscriminately. However, the use of these compounds in producing polymers makes these convenient choices. Hydride sources may also selectively react with the endgroup.

In one embodiment, a moiety is reacted with the cationic polymer end that contains a second functional group that can be used to link another desired moiety to the polymer. Non-limiting examples of second active functional groups include, but are not limited to (and protected as necessary) amines, imines, alkylsiloxysilane, hydroxyl, carboxylic acid, carboxylic acid chlorides, carboxylic acid anhydrides, amides, esters, sulfonic acid, sulfonic acid chlorides, phosphonic acid, phosphonic acid chloride, halogen or alkyl halides, alkynes, ethers, aldehydes, ketones, heteroaromatic compounds including pyridine, nitrites, amines, ammonium salts, and silanes.

In an alternative embodiment, a moiety can be added to the polymer that imparts specific biological properties to the polymer such as cationic charge (e.g., polylysine or other positive charge-bearing species, for tissue adherence), or provides a site for the attachment of a biologically active molecule, including but not limited to an antibody, antigen, protein, polysaccharide, nucleoprotein, lipoprotein, synthetic polypeptide, or a small molecule linked to a protein, steroid, nucleic acid, nucleotide, nucleoside, oligonucleotide (including antisense oligonucleotides), cDNA, nucleic acid, or gene.

In another embodiment, the active chains may be end-capped with a tris(organo)phosphoranimine having the formula $R'_3P=NSiR_3$. R' can be, independently, among other things alkyl, alkenyl, alkynyl, aryl, alkoxy, aryloxy. A specific example of a tris(organo)phosphoranimine is $(CF_3CH_2O)_3P=NSiMe_3$ where the presence of the $SiMe_3$ group permits reaction with the polymeric cation, while the absence of a chlorine unit at phosphorus results in termination. For example, when a polymerized solution of $Cl_3P=N-SiMe_3$, initiated with a 2% molar equivalent of $PCl_5$ in $CH_2Cl_2$, was treated with trace quantities of $(CF_3CH_2O)_3P=NSiMe_3$ at regular intervals during the polymerization, the growth of the polymeric cation was quenched as monitored $^{31}P$ NMR spectroscopy. GPC examination of the resultant polymers after chlorine replacement with $NaOCH_2CF_3$ showed a consistent range of molecular weights for the end-capped polymerization (see Table III). Unfortunately, the presence of the terminal $-N=P(OCH_2CF_3)_3$ group in the end-capped polymer could not be confirmed from the $^{31}P$ NMR spectrum of an oligomeric sample of poly(dichlorophosphazene) synthesized from treatment of $Cl_3P=N-SiMe_3$ with a 20% molar equivalent of $PCl_5$. The resonance for the terminal $-N=P(OCH_2CF_3)_3$ species was perhaps concealed by resonances for the oligo(dichlorophosphazene) species. In a further effort to confirm the presence of such endcapping groups, an oligomeric sample of $[N=PCl_2]_n$, synthesized by treatment of $Cl_3P=N—SiMe_3$ with a 10% molar equivalent of $PCl_5$, was treated with $Me_2(CF_3CH_2O)P=NSiMe_3$. Examination of this endcapped species by $^{31}P$ NMR spectroscopy revealed the terminal $—N=PMe_2(OCH_2CF_3)$ species from a doublet resonance at 9.4 ppm. The $M_n$ of this endcapped oligomer was found to be $5.9 \times 10^3$ (PDI=1.05, by GPC) after macromolecular substitution with $NaOCH_2CF3$.

TABLE III+HU a

| Time (h) | $Cl_3P = N—SiMe_3$/ $[N = PCl_2]_n$ | $M_n \times 10^{-4}$ Found | $M_n \times 10^{-4}$ Calculated[b] | PDI |
|---|---|---|---|---|
| 1.25 | 70/30 | 2.6 | — | 1.06 |
| 2.5 | 36/64 | 3.2 | — | 1.05 |
| 3.75 | 5/95 | 3.8 | — | 1.03 |
| 24 | 0/100 | 4.0 | 2.4 | 1.02 |

[a]All experiments were carried out with a monomer to initiator ratio of 50:1.
[b]Calculated from the initial ratio of monomer to $PCl_5$ initiator.

EXAMPLE 8

Activity of Growing Polyphosphazene Chain

The activity of the growing polymer chain of poly (dichlorophosphazene) was investigated. A solution of poly (dichlorophosphazene) in $CH_2Cl_2$ was prepared in which all of the phosphoranimine had been converted to polymer as determined by $^{31}P$ NMR spectroscopy. A portion of this was subjected to halogen replacement to yield a trifluoroethoxy-substituted polymer with an $M_w=1.1 \times 10^4$ with a PDI=1.04. A further addition of phosphoranimine to the remainder of the original (unsubstituted) solution resulted in the continued conversion of $Cl_3P=NSiMe_3$ to polymer over 48 hours. The GPC trace of the trifluoroethoxy-derivatized polymer from this solution showed the presence of polymer with a $M_w=9.2 \times 10^5$ with a PDI=1.71. Thus, it appears that the active chain ends can resume chain growth following the addition of more monomer. This opens up many possibilities for control over the chain length and coupling of the chain ends to other monomers or polymers.

VI. Block Copolymerization of Polyphosphazenes

The method of preparation of polyphosphazenes disclosed herein provides a route for the first time to a wide variety of phosphazene block copolymers. Using the prior art methods, the only known block copolymers were $[NP(OR_1)_2]_x$ $[NP(OR_1)(OR_2)]_y$, wherein $R_1$ is halogenated alkoxy and $R_2$ is an aliphatic or aryl moiety. It is now possible to obtain block copolymers other than these limited polymers.

Block copolymers of polyphosphazenes can be prepared using at least three different methods. In a first embodiment, a block copolymer is prepared by the cationic polymerization of monomers initiated by the active end groups of the polyphosphazene. Any monomer or polymer capable of reacting with a cationic site can be used. Examples of monomers that react by cationic mechanisms include epoxides, oxiranes, episulfides, trioxanes, tetrahydrofurans, vinyl ethers, acrolein, and other olefins capable of cationic polymerization, such as 1-alkyl olefins (α-olefins), 1,1-dialkyl olefins, 1,3-dienes, styrene, a-methyl styrene, N-vinyl carbazole, N-vinyl pyrrolidone, and aldehydes and ketones. Additionally, other phosphazene monomers can be used to create phosphazene-phosphazene blocks. The active organic block can then be reacted with additional phosphoranimine monomer, that is the same as or different from that used in the first phosphazene polymer block. This procedure can be continued as long as desired using any variety of cationic organic and phosphoranimine monomers, or different phosphoranimine monomers without organic blocks. Blocks should be added prior to substitution since substitution can deactivate the chain ends.

In a second embodiment for the production of block copolymers of polyphosphazenes, functionalized compounds are reacted with the active polyphosphazene end that have a moiety that will initiate a reaction mechanism other than cationic polymerization, for example, anionic or radical initiation. Any initiator that can be attached to the end of a polymer chain and is incorporated into the second block can be used. For example, endcaps with bromophenyl moieties can be converted to an appropriate organometallic species, for example, grignard or organolithium reagents, to initiate anionic polymerization of appropriate monomers. Alkene moieties can be used for metathesis reactions. Optionally, at an appropriate time, one can then react the anionic end with a monomer or polymer that has a group capable of initiating cationic polymerization to add another polyphosphazene block. Examples of these monomers include vinyl ether and butadiene. The monomer must undergo a living polymerization to have ABA block formation of phosphazene-organic-phosphazene in this manner. For example, the use of endcaps that contain haloalkyl or haloaryl moieties, for example, bromophenyl moieties, can be converted to an appropriate organometallic reagent, such as a grignard or organolithium reagent, to allow for the anionic polymerization of monomers that polymerize through anionic mechanisms, such styrene siloxanes, ethylene acrylates, methacrylates, acrylamide, methacrylamide, acrylonltrile, and methacrylonitrile. Optionally, at an appropriate time, one can then react the anionic end with a monomer or polymer that has a group capable of initiating cationic polymerization to add another polyphosphazene block. The use of preformed polymers with reactive endgroups which can be capped with phosphoranimines and converted to active $P=NP^+$ salts amino or hydroxyl terminated polymers can be used as templates for the synthesis of macroinitiators of the type, $PCl_6Cl_3P^+—N=PR_2—Polymer—R_2P=NPCl_3^+PCl_6^-$. Thus synthesis of multiblock copolymers is possible via growth from the prepolymer chain ends.

In a third embodiment for the preparation of block copolymers, initiators for the phosphazene polymerization can be included in other polymer systems. For example, an organic polymer with an $N=PR_3$ endgroup can be used to initiate phosphazene polymerization.

EXAMPLE 8a

Preparation of Organic Polymer/Polyphosphazene Block Copolymer

The commercially available polymeric bidentate amine $NH_2—PEG—NH_2$ [where $PEG=—CH_2CH_2O(CH_2CH_2O)_n—CH_2CH_2—$, $M_n=3400$] was mixed with $(CF_3CH_2O)_2BrP=NSiMe_3$ in the presence of $NEt_3$ to produce the phosphoranimine $NH(R_2P=NSiMe_3)—(CH_2CH_2O)_n—CH_2CH_2N(H)(R_2P=NSiMe_3)$. Subsequently, the phosphoranimine was reacted with two molar equivalents of $PCl_5$ at $-78°$ C. in $CH2Cl_2$ which resulted in the formation of the macroinitiator $NH(R_2P=NPCl_3^+)$ $PCl_6^-$ $(CH_2CH_2O)_n$—$CH_2CH_2N$ $(H)[R_2P=NPCl_3^+]$ $PCl_6^-$. This macroinitiator was then treated with a thirty fold excess of Cl3P=NSiMe3 and after 3 h at 25° C. examination of the reaction mixture by 31P NMR spectroscopy revealed the complete conversion to a new form of poly(dichlorophosphazene), $NHR_2P$—$(N=PCl_2)_m$—$(CH_2CH_2O)_n$—$CH_2CH_2N(H)Cl_2P[N=PR_2]_m$. This product was treated with an excess of a sodium trifluoroethoxide in dioxane solution to replace the chlorine atoms by trifluoroethoxy groups and generate the hydrolytically stable block copolymer $NHR_2P$—$(N=PR_2)_{(CH_2CH_2O)_n}$—$CH_2CH_2N(H)R_2P[N=PR_2]_m$ with $R=OCH_2CF_3$. Analysis of this block copolymer by gel permeation chromatography (GPC) in THF indicated that it possessed an $M_n$ of $1.5 \times 10^4$ and a polydispersity index of 1.16 versus polystyrene standards.

VII. Triarmed-Star Polyphosphazenes

EXAMPLE 9

Synthesis of the Triarmed-Star Polyphosphazene

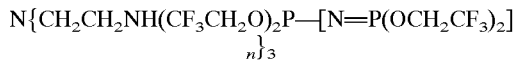

Phosphoranimines such as can readily undergo substitution reactions in the presence of alkoxides or amines, to produce $(CF_3CH_2O)_2RP=NSiMe_3$ species (R=RO— or RNH—). With this in mind, the tridentate primary amine $N(CH_2CH_2NH_2)_3$ was mixed with $(CF_3CH_2O)_2$ $BrP=NSiMe_3$, in the presence of $NEt_3$, to produce the trifunctional phosphoranimine $N\{CH_2CH_2NH(CF_3CH_2O)_2P=NSiMe_3\}_3$. Subsequent reaction of $N\{CH_2CH_2NH(CF_3CH_2O)_2P=NSiMe_3\}_3$ with six molar equivalents of $PCl_5$ at $-78°$ C. in $CH_2Cl_2$ resulted in the formation of the trifunctional cationic species $[N\{CH_2CH_2NH(CF_3CH_2O)_2P=N-PCl_3^+\}_3]$ $[PCl_6^-]_3$. This species was then treated with a thirty-fold excess (per reactive site) of $Cl_3P=NSiMe_3$ in $CH_2Cl_2$. After 3 h at 25° C., examination of the reaction mixture by $^{31}P$ NMR spectroscopy revealed the complete conversion of $Cl_3P=N-SiMe_3$ a new form of poly(dichlorophosphazene), $(N=PCl_2)_n$, based on a characteristic resonance at $-17$ ppm with loss of the doublet resonances for $[N\{CH_2CH_2NH(CF_3CH_2O)_2P=N-PCl_3^+\}_3]$ $[PCl_6^-]_3$. Also detected was a doublet resonance at ca. 8.2 ppm, as well as triplet resonances at $-14.5$, and $-15.5$ ppm, consistent with the presence of the star-polymer $N\{CH_2CH_2NH(CF_3CH_2O)_2P=N-PCl_2N=PCl_2[N=PCl_2]_n\}_3$. Integration of the $^{31}P$ NMR resonances associated with the star polymer were consistent with theoretical values based on the initial reactant ratio. This product was treated with an excess of sodium trifluoroethoxide to replace the chlorine atoms by trifluoroethoxy groups and generate the hydrolytically stable star-polymer $N\{CH_2CH_2NH(CF_3CH_2O)_2P-[N=P(OCH_2CF_3)_2]_n\}_3$. Analysis of this polymer by gel permeation chromatography (GPC) indicated that it possessed an $M_n$ of $2.1 \times 10^4$ and a polydispersity index of 1.03 versus polystyrene standards. The molecular weights of these star-polymers can be controlled by variation of monomer:initiator ratios (see Table IV). End-group analysis by $^{31}P$ NMR spectroscopy was also used to provide molecular weight estimates in cases where the end-group unit [—N—P $(OCH_2CF_3)_2^-$] was detectable.

TABLE IV

| M:I/ Reactive Site | Reaction Time (h) | $M_n$ Found[a] | $M_n$ Found[b] | $M_n$ Calculated[c] | PDI |
|---|---|---|---|---|---|
| 10:1 | 0.66 | 12,630 | 9,146 | 9,146 | 1.05 |
| 15:1 | 1 | 16,987 | 12,971 | 12,971 | 1.02 |
| 30:1 | 3 | 20,610 | 23,726 | 23,726 | 1.03 |
| 50:1 | 6 | 35,319 | NA | 38,306 | 1.03 |
| 100:1 | 14 | 41,606 | NA | 74,756 | 1.36 |

[a]Molecular weights by GPC following replacement of Cl by $NaOCH_2CF_3$.
[b]Molecular weights by end group analysis using $^{31}P$ NMR spectroscopy.
[c]Calculated at 100% conversion.

Preliminary comparisons of the physical properties of low molecular weight samples of $N\{CH_2CH_2NH(CF_3CH_2O)_2P-[N=P(OCH_2CF_3)_2]_n\}_3$ with the linear analogue $[N=P(OCH_2CF_3)_2]_n$ of comparable molecular weight ($1.2 \times 10^4$), revealed that, while the linear polymer is a crystalline white fibrous material which readily forms films, the triarmed star polymer is a pale yellow, viscous gum. The corresponding star and linear polymers with molecular weights higher than $1.7 \times 10^4$ show similar physical characteristics. In addition, GPC chromatograms for $N\{CH_2CH_2NH(CF_3CH_2O)_2P-[N=P(OCH_2CF_3)_2]_n\}_3$ with $M_n$ above $2.1 \times 10^4$ appear to underestimate the molecular weight and provide indirect evidence of its branched nature. Due to the well-known fire-retardant properties of polyphosphazenes, these controlled molecular weight star polymers may prove useful as additives to flammable organic polymers.

Modifications and variations of the present invention will be obvious to those skilled in the art from the foregoing detailed description of the invention. Such modifications and variations are intended to come within the scope of the appended claims.

We claim:

1. A poly(organophosphazene) having the formula $N\{RN(H)R'_2P-(N=PR'_2)_2)_n\}_3$ wherein R is aliphatic and R' is independently selected from the group consisting of alkyl, alkenyl, alkynyl, aralkyl, alkaryl, aryl, heteroalkyl, and heteroaryl.

2. The poly(organophosphazene) of claim 1 wherein R is alkyl and R' is alkoxy.

3. The poly(organophosphazene) of claim 1 having the formula $N\{CH_2CH_2NH(CF_3CH_2O)_2P-[N=P(OCH_2CF_3)_2]_n\}_3$.

4. A process for the preparation of cyclic trimer $N_3P_3X_6$ comprising reacting $N(SiR_3)_3$ with $PX_5$ wherein X is [halo] Cl, Br, I, or F and R is alkyl.

5. A process for the preparation of $Cl_3P=NSiMe_3$ comprising reacting $N(SiR_3)_3$ with $[PX_5]$ $PCl_5$ wherein [X is halo and] R is alkyl.

6. The process according to claim 4 wherein X is Cl.

* * * * *

UNITED STATES PATENT AND TRADEMARK OFFICE
CERTIFICATE OF CORRECTION

| | | |
|---|---|---|
| PATENT NO. | : 5,914,388 | Page 1 of 1 |
| APPLICATION NO. | : 08/917069 | |
| DATED | : June 22, 1999 | |
| INVENTOR(S) | : Harry R. Allcock et al. | |

It is certified that error appears in the above-identified patent and that said Letters Patent is hereby corrected as shown below:

Column 1, Line 11, after related applications, and before "FIELD OF THE INVENTION" insert the following:

--GOVERNMENT SPONSORSHIP
This invention was made with support from the Government under DOE Grant No. DE-FG02-93ER14387. The Government has certain rights to this invention.--

Signed and Sealed this

Twenty-second Day of January, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 5,914,388 | Page 1 of 1 |
| APPLICATION NO. | : 08/917069 | |
| DATED | : June 22, 1999 | |
| INVENTOR(S) | : Harry R. Allcock et al. | |

It is certified that error appears in the above-identified patent and that said Letters Patent is hereby corrected as shown below:

Column 1, Line 11, after related applications, and before "FIELD OF THE INVENTION" insert the following:

--GOVERNMENT SPONSORSHIP
This invention was made with government support under Contract No. N00014-91-J-1194, awarded by the Office of Naval Research. The Government has certain rights in the invention.--

Signed and Sealed this

Twelfth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 5,914,388
APPLICATION NO. : 08/917069
DATED : June 22, 1999
INVENTOR(S) : Harry R. Allcock et al.

It is certified that error appears in the above-identified patent and that said Letters Patent is hereby corrected as shown below:

*Column 1, line 12, the following should be inserted:*

--REFERENCE TO GOVERNMENT SPONSORSHIP

This invention was made with government support under Contract No. N00014-91-J-1194, awarded by the Office of Naval Research, Contract No. DE-FG02-93ER14387, awarded by the Department of Energy and Award No. 95-G-033, awarded by the Federal Aviation Administration. The Government has certain rights in the invention.--

This certificate supersedes the Certificates of Correction issued January 22, 2008 and August 12, 2008.

Signed and Sealed this

Twenty-sixth Day of January, 2010

David J. Kappos
*Director of the United States Patent and Trademark Office*